United States Patent [19]
Cunningham, Jr.

[11] 4,027,618
[45] June 7, 1977

[54] PUNCTURE DETECTING DEVICE

[76] Inventor: Hugh Cunningham, Jr., 104 Plano Drive, Greenville, S.C. 29609

[22] Filed: Nov. 10, 1976

[21] Appl. No.: 740,555

[52] U.S. Cl. .......................... 116/114 G; 33/178 F
[51] Int. Cl.² .................... G01B 5/12; G01D 21/00
[58] Field of Search ................... 116/114 R, 114 G; 33/178 R, 178 F

[56] References Cited
UNITED STATES PATENTS

| | | | |
|---|---|---|---|
| 309,666 | 12/1884 | Traver | 33/178 R |
| 518,638 | 4/1894 | Weston | 33/178 R |
| 1,619,771 | 3/1927 | Tingley | 33/178 R |
| 2,378,156 | 6/1945 | Oishei et al. | 116/114 G |
| 2,499,251 | 2/1950 | Marascio | 33/178 R |
| 2,584,602 | 2/1952 | McKee | 33/178 R |

*Primary Examiner*—Richard C. Queisser
*Assistant Examiner*—Daniel M. Yasich
*Attorney, Agent, or Firm*—Bailey, Dority & Flint

[57] ABSTRACT

A handtool device for detecting puncture openings in an interior bore surface of a tubular carrier member upon which carpet is rolled for transportation includes an elongated handle member for moving the device through the tubular bore and an adapter body member carried adjacent one end of the handle member. A plurality of resilient prong members are affixed to the adapter body member inclined to the axis of the handle member extending outwardly therefrom having free ends biased against the interior bore surface when inserted therein for engaging within a puncture opening during movement through the bore.

6 Claims, 4 Drawing Figures

PUNCTURE DETECTING DEVICE

BACKGROUND OF THE INVENTION

The transportation and handling of large rolls of carpet and other material require that the carpet be wound upon a tubular carried member normally constructed from heavy cardboard. The blade of a forklift may be inserted in the bore of the tubular member for handling and moving the roll of carpet. The blade of the forklift sometimes punctures the inside bore structure of the cardboard tubular member resulting in damage to the carpet or other material rolled upon the tubular member adjacent the exterior surface thereof. When the roll of carpet is delivered to the wholesale or retail consumer, it is difficult to detect such a perforation or break in the cardboard or carpet until the carpet has been completely removed from the tubular carrier member. It is desirable to support a claim for damage that the roll of carpet be inspected at the time it is delivered.

While prior devices have been developed for generally detecting wear and erosion within the bore of a pipe such as shown in U.S. Pat. No. 3,139,686, such are entirely unsuitable for solving the instant problem due to the size and complexity of the devices.

SUMMARY OF THE INVENTION

It has been found that an effective handtool device can be provided for detecting puncture openings in an interior bore surface of a tubular carrier member upon which carpet and the like is rolled for transportation. The device includes an elongated handle member for moving the device through the tubular bore and an adapter body member carried adjacent one end of the handle member having a plurality of resilient prong elements carried thereon. The prong elements are inclined to the axis of the handle member and extending outwardly therefrom. The prong elements have free ends biased against the interior bore surface when inserted therein for engaging within a puncture opening when detected during movement through the bore.

Accordingly, an important object of the present invention is to provide an effective handtool device for inspecting the interior bore surface of a tubular carrier member to detect the existence of a puncture opening therein.

Another important object of the present invention is to provide a handtool device for detecting puncture openings in the interior bore surface of a tubular carrier member which is simple to operate and is readily affordable to all carpet merchants.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
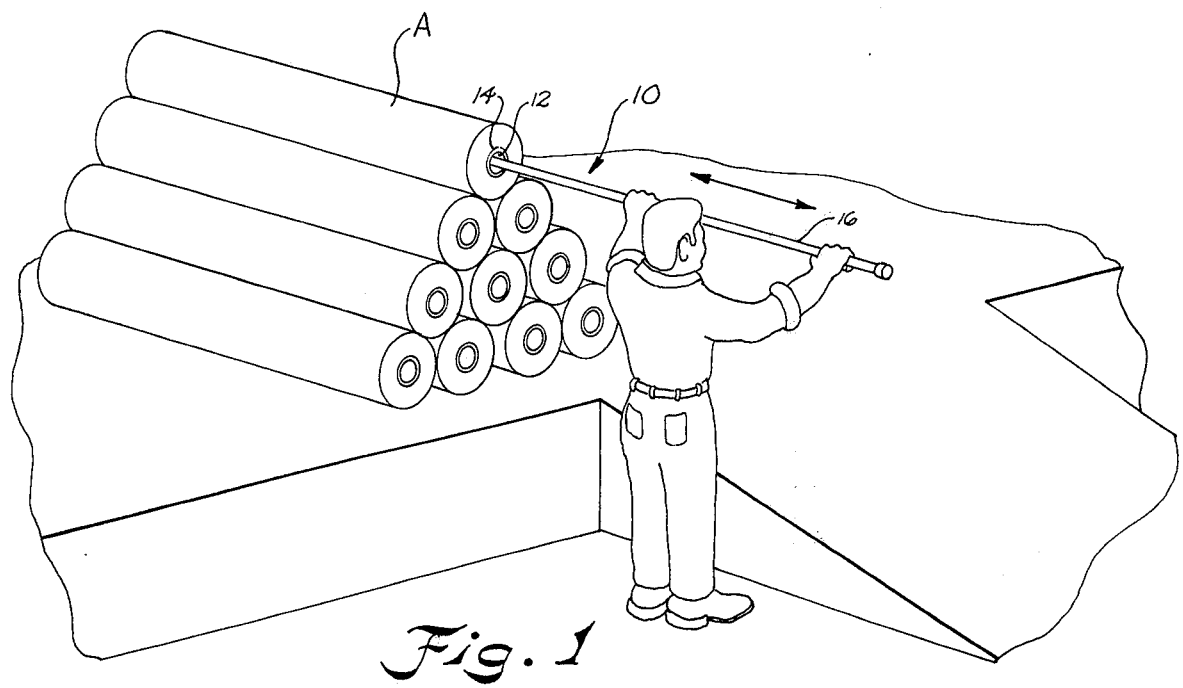
FIG. 1 is a perspective view illustrating the operation of a handtool device constructed in accordance with the present invention for detecting a puncture opening in the interior bore surface of the tubular member carrying a roll of carpet.
Figure 2:
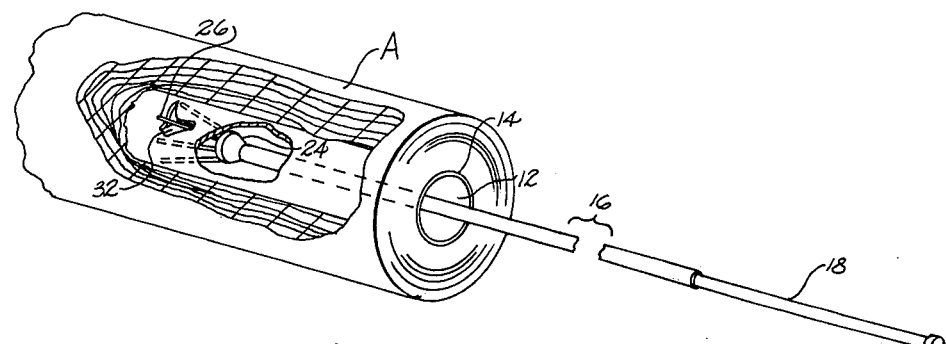
FIG. 2 is a partial cut-away view illustrating the detection of a puncture opening with a handtool device constructed in accordance with the present invention.
Figure 3:
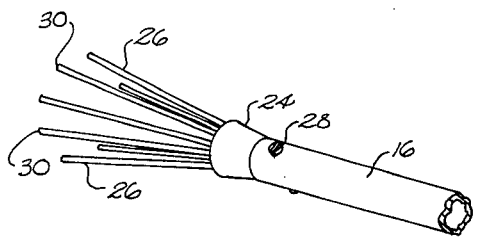
FIG. 3 is an enlarged perspective view illustrating the arrangement of the prong elements of a handtool device constructed in accordance with the present invention for detecting puncture openings.
Figure 4:
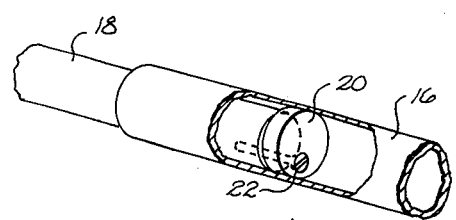
FIG. 4 is a partial cut-away perspective view of an adjustable telescoping handle section of the handtool constructed in accordance with the present invention.

This invention relates to the inspection of an interior bore surface of a tubular carrier member upon which there is rolled carpet material and the like. The existence of such a puncture opening is likely to indicate that a similar puncture or flaw exists in the carpet or other material rolled about the tubular member. More particularly, the invention relates to a handtool device for detecting such punctures whereby a merchant may readily determine any damage to the roll of carpet.

Referring now to the drawing, a handtool device is shown generally at 10 for being manually operated by an inspecter. The handtool device is slideably inserted within an internal bore 12 of a tubular carrier member 14 having a roll of carpet A carried thereon. The inspector then pushes the detector device through the bore.

Such large rolls are normally handled and transported by forklift machines whereby the blade of the forklift is inserted in the internal bore 12. Due to the heavy weight of the roll of carpet and the cantilevered manner in which it is supported on the blade of the forklift, a puncture of the cardboard material of the interior surface of the bore 12 can occur. If the blade of the forklift punctures the cardboard material, it almost certainly will puncture the carpet or other material rolled adjacent the exterior surface of the tubular cardboard member. Thus, it is important to be able to detect the existence of such a puncture at the time delivery was made so that a claim for damage can be promptly made.

The handtool device includes an elongated handle member 16 which the inspector may grasp for moving the handtool device through the tubular bore 12. The handle member includes at least one telescoping section 18 so that the handtool device may be made compact and still extend through carpet rolls up to fifteen feet in length. A lock means is provided by a pivotable cam member 20 which is affixed to the end of the telescoping section 18 by means of an off-center screw member 22. When the telescoping section 18 is withdrawn from the main handle section 16 to the desired length configuration, twisting of the telescoping section will tighten the cam member 22 within the interior bore of the main section 16 locking the handle sections together.

The handtool device further includes an adapter body member 24 carried adjacent one end of the handle member 16. A plurality of resilient prong elements 26 are carried by the adapter member 24 and are inclined to the axis of handle member 16 extending outwardly therefrom. The adapter body member 24 is preferably a solid plug body which is inserted within the end of handle member 16 and affixed by means of suitable screws 28. The prong elements 26 are affixed to the adapter body plug 24 by any suitable means such as by drilling and soldering the ends of the prongs therein.

Each prong element 26 consists of an elongated piece of wire which is bendable and resilient eliminating any need for more complex spring biased assemblies. The prong elements 26 are spaced equidistantly around the circumference of the adapter body member 24 so that the free ends 30 of the prong elements define a continuous ring-shaped pattern having a diameter slightly larger than that of the tubular bore 12. When the prong elements 26 are deformed or compressed by bending the free ends radially inward toward the axis of the handle member 16 for insertion within the bore 12, the free ends 30 are biased against the interior surface of the bore. As the handtool device 10 is pushed through the bore 12, a puncture opening 32 will be detected by a prong element engaging within the opening stopping the movement of the handtool device. Upon detection, wire element 26 is sufficiently resilient to allow the handtool device to be twisted past the puncture opening 32 and move forward for detection of further puncture openings.

Thus, it can be seen that an advatnageous construction for a handtool device can be had in accordance with the present invention which is simple to operate and can be readily affordable by any merchant. The device can quickly and easily detect the presence of any puncture openings in a tubular carrier member for carpet and like material eliminating any delay in the discovery of such punctures and defects which can result in the loss of a proper damage claim.

While a preferred embodiment of the invention has been described using specific terms, such description is for illustrative purposes only, and it is to be understood that changes and variations may be made without departing from the spirit or scope of the following claims.

What is claimed is:

1. A handtool device for detecting puncture openings in an interior bore surface of a tubular carrier member upon which carpet and the like is rolled for transportation comprising:
   an elongated adjustable length rigid handle member for moving said device through said tubular bore;
   an adapter body member carried adjacent one end of said handle member;
   a plurality of resilient bendable prong elements carried by said adapter member inclined to the axis of said handle member extending outwardly therefrom; and
   said prong elements having free ends biased against said interior bore surface when inserted therein for engaging within a puncture opening when detected during movement through said bore.

2. The device of claim 1 wherein said free ends of said prong elements define a substantially ring-shaped pattern having a diameter slightly larger than that of said tubular bore providing said biasing of said free ends against said interior bore surface when deformed by bending inwardly for insertion therein.

3. The device of claim 1 wherein said adapter body member includes a solid plug body affixed within said end of said elongated handle member, said prong members being fixably carried on said plug body.

4. The device of claim 1 wherein said elongated handle member includes at least one telescoping section having adjustable lock means for locking said section and handle member in a desired length configuration.

5. The device of claim 4 wherein said adjustable lock means includes an eccentric cam member carried adjacent the end of said telescoping section for engaging said handle member in a locking relationship when said telescoping section is twisted.

6. The device of claim 1 wherein each said prong elements comprises an elongated wire element.

* * * * *